Dec. 23, 1930.  E. P. KERRUISH  1,785,905
TOOL FOR SCARIFYING THE INTERIOR OF TUBING
Filed Aug. 26, 1926

*INVENTOR.*
Edward P. Kerruish
BY
*Fay, Oberlin + Fay*
*ATTORNEYS.*

Patented Dec. 23, 1930

1,785,905

UNITED STATES PATENT OFFICE

EDWARD P. KERRUISH, OF CLEVELAND HEIGHTS, OHIO, ASSIGNOR TO THE CLEVELAND GRAPHITE BRONZE COMPANY, OF CLEVELAND, OHIO, A CORPORATION OF OHIO

TOOL FOR SCARIFYING THE INTERIOR OF TUBING

Application filed August 26, 1926. Serial No. 131,669.

The present invention, relating as indicated to a method of making composite tubing, is more particularly directed to an improved composite tube composed of two or more layers of dissimilar metals and to a method of making the same which shall provide an extremely effective engagement between the different metals. Tubing of this character is used for various purposes, and particularly for bearings, and for this latter purpose a lining of some suitable bearing metal, such for example as brass, is mounted within an outer shell of a less expensive and stronger material, such as steel. It is important, both to prevent relative movement between the inner and outer tubes, and also to provide for an effective heat transference through the two tubes, that a secure engagement and contact be effected between the two tubes. The present invention is particularly directed to effecting such an engagement and contact between inner and outer tubes of a composite element such as described.

To the accomplishment of the foregoing and related ends, said invention, then, consists of the means hereinafter fully described and particularly pointed out in the claims; the annexed drawings and the following description setting forth in detail one method and one product exemplifying my invention, such disclosed procedure and product constituting, however, but one of various applications of the principle of my invention.

In said annexed drawings:—

Figure 1:
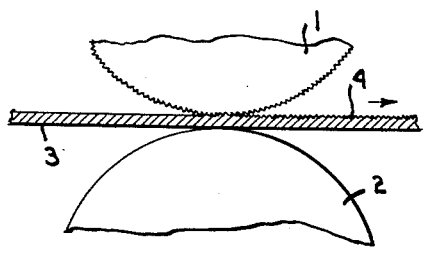
Figure 2:
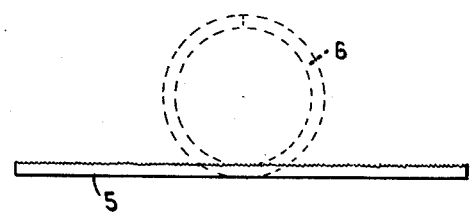
Figure 3:
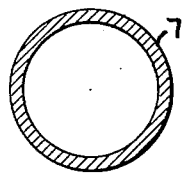
Figure 4:
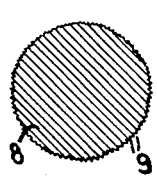
Figure 5:
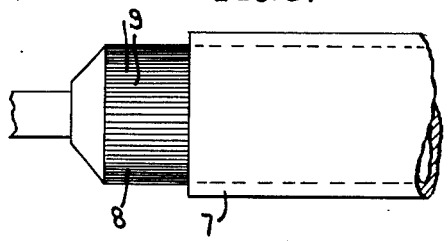
Figure 6:
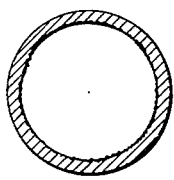
Figure 7:
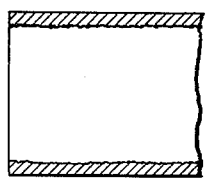
Figure 8:
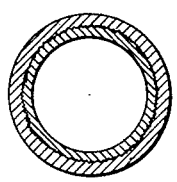
Figure 9:
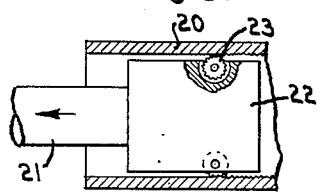
Figure 10:
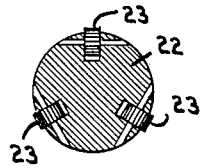
Figure 12:
Figure 11:
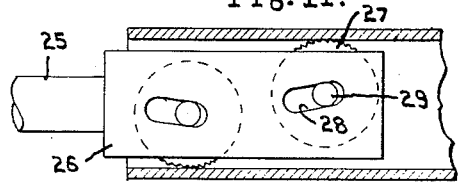

Fig. 1 is a transverse section through a pair of rolls operating upon a strip of material and illustrating the first step in my improved process; Fig. 2 is a side elevation of a blanked strip of metal after passage through the rolls of Fig. 1 and showing in dotted line the formation of this strip into a cylindrical bearing; Fig. 3 is a transverse section through a tube; Fig. 4 is a transverse section through a tool adapted to be forced through the tube of Fig. 3 to carry out one step of my improved method; Fig. 5 is a side elevation showing the tube in conjunction with the tool of Fig. 4; Figs. 6 and 7 are transverse and longitudinal sections, respectively, showing the interior of the tube after the operation either of Fig. 1 or of Fig. 5, or of an etching operation in which the interior of the tube wall is subjected to an acid treatment to produce an irregular or etched surface; Fig. 8 is a transverse section showing my composite tube after assembly; Figs. 9 and 10 are a longitudinal section and a transverse section, respectively, of a modified form of tool for carrying out the step of roughening or serrating the interior of a tube; Fig. 11 is a longitudinal section through still another type of tool; and Fig. 12 is a longitudinal section showing the tube wall after being operated on by the tools of Figs. 9, 10 and 11.

Referring now to Fig. 1, there are shown rolls 1 and 2 disposed upon parallel centers and adapted to operate upon a strip 3 of material which is passed therebetween. The roll 1 is provided with a roughened surface, which may be formed either by knurling the outside of this roll or by roughening it in various other ways, while the roll 2 is smooth, with the result that the upper surface 4 of the strip is roughened by passage beneath the roll 1 as indicated at the right of Fig. 1 and in Fig. 2. In the latter figure there is shown a blank 5 cut from the strip 4, which is then formed into cylindrical form 6 (see dotted line), with the roughened surface 4 of the strip on the inside of a cylindrical element which is thus formed.

In Fig. 3 there is shown a cylindrical tube 7, which may either be a split tube formed from a sheet of material, or may be unsplit. Through this tube is drawn a tool 8 shown in Fig. 4 provided with longitudinally extending projections or ribs 9 on its outer surface adapted to force their way through the inner surface of the tube 7, producing corresponding longitudinal grooves or ribs of extremely shallow depth in the inner surface of this tube.

In Figs. 6 and 7 there are shown respectively a transverse section and a longitudinal section of a tube provided with an etched inner wall produced by treating this surface with a solvent for the material, such as an acid, which produces an extremely irregular surface and one in which the depressions are in the form of irregular and irregularly disposed pock marks.

In Fig. 9 I have shown a tube 20, which may be either split or seamless, through which there may be drawn a tool consisting of a shaft or rod 21 and a member 22, in which are mounted a series of rotatable knurling rolls 23. The outermost diameter of the member 22, at the point of projection of the rolls 23, is slightly greater than the interior diameter of the tube and thus the movement through the tube of this tool will produce a series of indentations in the interior wall of the tube, the extent of the indentations around the tube depending of course upon the number and position of the rolls 23. In Fig. 10 there is shown a transverse section of this tool, in which I have shown three rolls 23, but it will of course be understood that any suitable number may be employed.

Another form of tool is shown in Fig. 11, this tool consisting of a shaft 25 and a member 26 in which are mounted knurling rolls 27 provided with slots 28, in which are received pins 29, which hold the rolls in position. The action of these rolls as the tool is pulled through the tube will be obvious, and the result on the tube wall will of course be the same as that of the tool of Figs. 9 and 10, the resulting tube being shown in Fig. 12.

After the inner surface of the tube designed to constitute the outer wall of a composite tubing is thus roughened by one of the various methods described an inner tube or liner, either split or unsplit and formed of a suitable material for withstanding the service to which the inside of the composite body is subjected, as for example brass in the case of a bearing metal, is drawn into the outer tube and then over a mandrel, which expands the inner tube into a secure engagement with the outer, flowing the metal of the liner into the tiny irregularities in the inner surface of the outer tube.

The present method produces composite tubes in which there is a complete and enlarged area of contact between the adjacent tube walls, and one in which the contact is more than merely contact but is also an engagement which locks the two tubes together against both longitudinal and rotational movement between the two tubes.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. A tool for scarifying the internal surface of tubing, said tool being provided with knurling means, said tool having a diameter larger than the interior diameter of said tubing.

2. A tool for internally scarifying tubular members comprising a shank and a body member carrying cutting teeth, the diameter of said member measured to the external surface of said teeth being slightly greater than the internal diameter of the member to be scarified.

3. A tool for internally scarifying tubular members comprising a shank and a body member, and knurling rolls carried by said body member, the peripheries of said rolls projecting beyond the surface of said body member and extending from the axis of said body member a distance slightly greater than the internal radial dimension of the member to be scarified.

4. A tool for internally scarifying tubular members comprising a shank and a body member, said body member being provided with a transverse slot, a knurling roll mounted in said slot and extending outwardly therefrom, the axis of said roll being shiftable transversely of said body member to vary the degree of extent of said roll beyond the confines of said slot.

5. A tool for internally scarifying tubular members comprising a shank and a body member, said body member being provided with a transverse slot, a pair of mating cam slots formed in opposite walls of said transverse slot, and a knurling roll mounted in said transverse slot and extending outwardly therefrom, the axle of said roll having its ends received in said cam slots.

6. A tool for internally scarifying tubular members comprising a shank and a body member, said body member being provided with a transverse slot, a pair of mating cam slots formed in opposite walls of said transverse slot, and extending upwardly and away from the shank, a second pair of mating cam slots formed in the opposite walls of said transverse slot and extending downwardly and away from the shank, and a pair of knurling rolls mounted in said transverse slot, the axle of one of said rolls having its ends received in one pair of said cam slots and the axle of the other of said rolls having its ends received in the other pair of slots, whereby said rolls are urged outwardly into intimate engagement with the walls of such tubular member when said tool is drawn through such member by its shank.

Signed by me, this 24th day of August, 1926.

EDWARD P. KERRUISH.